(12) United States Patent
Vermeulen et al.

(10) Patent No.: US 6,326,082 B1
(45) Date of Patent: Dec. 4, 2001

(54) SECURITY DOCUMENT COMPRISING A MIXTURE OF POLYURETHANES

(75) Inventors: Leo Vermeulen, Herenthout; Michel Boulonne, Kappelle-op-den-Bos; Walther Wouters, Heist o/d Berg; Diane Vertruyen, Zoersel; Huub Van Aert, Mortsel, all of (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 09/518,254

(22) Filed: Mar. 3, 2000

Related U.S. Application Data
(60) Provisional application No. 60/130,505, filed on Apr. 23, 1999.

(30) Foreign Application Priority Data
Mar. 11, 1999 (EP) .................................................. 99200772

(51) Int. Cl.⁷ ..................................................... B32B 27/40
(52) U.S. Cl. .................. 428/423.1; 428/523; 428/423.7; 525/131
(58) Field of Search ............................... 428/423.1, 423.7, 428/424.8, 412, 523; 525/457, 458, 460, 131

(56) References Cited

U.S. PATENT DOCUMENTS
| | | | | |
|---|---|---|---|---|
| 3,658,635 | * | 4/1972 | Eustice | ................................. 161/190 |
| 5,439,872 | | 8/1995 | Ito et al. . | |

FOREIGN PATENT DOCUMENTS
| | | |
|---|---|---|
| 0 340 163 A2 | 11/1989 | (EP) . |
| 0 340 163 A3 | 11/1989 | (EP) . |
| 0 421 609 A2 | 4/1991 | (EP) . |
| 0 421 609 A3 | 4/1991 | (EP) . |
| 0 476 636 A1 | 3/1992 | (EP) . |

* cited by examiner

Primary Examiner—James J. Seidleck
Assistant Examiner—Melanie Bagwell
(74) Attorney, Agent, or Firm—Breiner & Breiner, L.L.C.

(57) ABSTRACT

According to the present invention there is provided a laminating element comprising a transparent support coated with a thermally non-reversible layer comprising an ethylene-acrylic acid copolymer, a first polyurethane polymer and a second polyurethane polymer, said layer having a pH of at least 10 and containing a metallic or an amphoteric cation.

10 Claims, No Drawings

SECURITY DOCUMENT COMPRISING A MIXTURE OF POLYURETHANES

This Application claims the benefit of the U.S. Provisional Application No. 60/130,505, filed Apr. 23, 1999.

FIELD OF THE INVENTION

The present invention relates to a security laminate that is thermally non reversible.

BACKGROUND OF THE INVENTION

Security documents that must be verifiable on their authenticity are e.g. all kinds of identification documents such as passports, visas, identity cards, driver licenses, bank cards, credit cards, security entrance cards, and further value-documents such as banknotes, shares, bonds, certificates, cheques, lottery tickets and all kinds of entrance tickets such as airplane tickets and railroad season-tickets.

Said security documents are in many cases made by the lamination of a data containing card. Said laminate can be single-sided when f.i. a card is laminated on a paper support as in a passport. It is required that said laminates are foolproof. However most laminates delaminate when heated at about 100° C. This poses a serious problem.

OBJECTS OF THE INVENTION

It is an object of the present invention to provide a laminated security document whereof the laminate is thermally non reversible.

It is a further object of the invention to provide a security document that can hardly be falsified.

SUMMARY OF THE INVENTION

According to the present invention there is provided a laminating element comprising a transparent support coated with a thermally non-reversible layer comprising an ethylene-acrylic acid copolymer, a first polyurethane polymer and a second polyurethane polymer, said layer having a pH of at least 10 and containing a metallic or an amphoteric cation.

DETAILED DESCRIPTION OF THE INVENTION

According to the invention, the laminate comprises two layers.

The first layer consist of a transparent flexible support. The transparent support is preferably a plastic such as polycarbonate, polypropylene, more preferably a polyester, most preferably polyethylene terephthalate. The thickness of said layer ranges preferably from 5 to 100 $\mu$m. Said support is coated on one side, called the inner side with a thermally non reversible layer. The inner side of the transparent support can be imprinted with various kinds of ink such as UV-inks, optical varying inks, optical varying colors, with colors such as pastel tints. Furtheron, holograms can be used. Suitable holograms are see-through holograms and high index reflective holograms. The image can be obtained by inkjet, by chromapress, by wax printers or laser printers.

The thermally non reversible layer comprises an ethylene-acrylic acid copolymer and a mixture of two polyurethanes. Said copolymer is an ionomer and is brought at a pH of at least 10, more preferably at a pH between 10.5 and 11.5 before being coated. Said pH adjustment can be done with alkali such as sodium or potassium hydroxide but preferably at least for a part with a polyvalent metal hydroxide such as magnesium hydroxide. Olefines, like ethylene or propylene can be copolymerized with polymerizable carboxylic acids, like acrylic or methacrylic acids. The acid groups are know to promote excellent adhesion to various substrates and give an outstanding toughness, which is maintained at low temperatures. Copolymers are available with (meth)acrylic acid content upto ca. 20%. These copolymers are used in various applications as described in the encyclopedia of polymer science and engineering, volume 6, John Wiley & Sons, 1986. Most frequently used are ethylene-acrylic acid copolymers. Three important changes occur when a small amount of acrylic acid is randomly copolymerized with ethylene, in comparison to a pure polyethylene: 1. The carboxylic groups are free to form bonds and to interact with any polar substrate. Increases in adhesion are essentially proportional to the comonomer content. 2. Carboxylic groups on adjacent chains can hydrogen-bond with each other. This produces thoughness far in excesss of that achieved with conventional LDPE homopolymers having equivalent molecular weight. The thoughness can further be increased when these polymers are converted into ionomers. 3. The bulky carboxyl groups inhibit the ability of the polymer to crystallize. This improves optical clarity and reduces both melting and softening points.

Copolymers which might be used are:

Ethylene-acrylic acid copolymers (EAA-copolymers)), e.g. Primacor 4990, Primacor 5980, trade names of Dow, AC 540, A-C 5120, trade names of Allied Signal Chemicals ect.

Ethylene-methacrylic acid copolymers.

Propylene-acrylic acid copolymers.

Ethylene-propylene-acrylic acid copolymers

Most frequently used are the methacrylic acid-ethylene and acrylic acid ethylene copolymers The olefin-(meth)acrylic acid copolymers are often used as an "ionomer". "Ionomer" is a generic term for copolymers of an olefin (ethylene, butadiene, styrene, ect.) with a carboxylic monomer (acrylic acid, methacrylic acid) which have been neutralized, the H+ions being replaced by other cations (Na+, Zn2+, etc.). Accordingly, the general understanding is that in a medium of low dielectric constant (e.g. hydrocarbon chains) the ions form aggregates. At lower ion contents, the ions aggregate to form multiplets, i.e. small aggregates (several ion pairs). At higher ion concentrations, many ions along with nonionic material give rise to sizeable clusters which not only act as crosslinks but more like microcrystallites. Well known are the ionomers as produced by DuPont under the tradename Surlyn (e.g. Surlyn ethylene-methacrylic acid copolymer Zn-salts; ethylene-methacrylic acid copolymer sodium-salt), and the AClyn products produced by Allied Signal (e.g. AClyn 295A: ethylene acrylic acid copolymer Zn-salts). The ionic cluster formation and phase segregation have a significant impact on the physical properties of the ionomers. The resulting properties of the ionomers are dependent on the molecular weight, the acrylic acid content, the type of cation, and the degree of neutralization of the base copolymer.

The thermal behaviour of the EAA copolymers and their salts can be explained by means of a three-phase model consisting of a polyethylene crystal phase, a mixed amorphous phase and a micro-phase separated ionic cluster phase as described by W. J. MacKnight (J. Polym. Sci. Symp., No. 46, 83–96 (1974)). The crystallinity of EAA copolymers and ionomers decreases with increasing acrylic acid content. Upon increasing the acrylic acid content a lower crystallinity is obtained as described by R. L. McEvoy (Polymer, vol. 39, 5223–5239 (1998) and by W. J. MacKnight (J. Polym. Sci. Symp., No. 46, 83–96 (1974)). EAA Copolymers with 20% of acrylic acid show no or a only very low crystallinity. Upon higher degree of neutralization (increased ionization) the mechanical properties improve (increase in ultimate tensile strength and melt flow viscosity) and the main Tg (glass transition temperature) often described as β-relaxation of the ethylene ionomers decreases. When aqueous dispersions of EAA copolymers or ionomers are used also a higher degree of neutralization can be obtained by addition of an aqueous alkali metal hydroxide solution (such as an aqueous NaOH solution). Upon employing a higher pH of the casting solution mechanical properties of the obtained layer are improved. Upon use of multiple charged cations, such as Zn2+, Ca2+, ect., usually higher melt viscosities are obtained.

The copolymer of ethylene-acrylic acid contains preferably between 15 and 25% acrylic acid, more preferably about 20% acrylic acid. The Tg of the ethylene-acrylic acid copolymer or of the mixture of said copolymer with the two polyurethanes lies below $-17°$ C., more preferably below $-19°$ C.

The first polyurethane is preferably an anionic aliphatic polyester, preferably with a viscosity between 400 and 600 mPa.s, more preferably with a viscosity between 450 and 550 mPa.s. The pH of said polyurethane is preferably around 8. The second polyurethane is preferably an aliphatic polyether, preferably with a viscosity between 250 and 450 mPa.s, more preferably with a viscosity between 300 and 400 mPa.s. The pH of said polyurethane is preferably around 8.

The copolymer ethylene-acrylic acid is preferably present in the thermally non reversible layer in an amount between 4 and 12 $g/m^2$, more preferably in an amount of 7 $g/m^2$. The first polyurethane is permeably present in an amount between 1.7 and 4.4 $g/m^2$, more preferably in an amount of 2.6 $g/m^2$. The second polyurethane is preferably present in an amount between 1.5 and 4.0 $g/m^2$, more preferably in an amount of 2.4 $g/m^2$. The thickness of said layer is preferably between 7.2 and 18 $g/m^2$, more preferably about 12 $g/m^2$.

The ratio of the copolymer ethylene-acrylic acid versus the first or second polyurethane lies preferably between 2 and 5, more preferably between 2.2 and 3.2.

Said laminate is preferably laminated over a card containing data or/and images onto a paper support. In another embodiment, said thermally non-reversible layer is imprinted with personalized data and then laminated onto a paper support. An example of such an application is a passport booklet.

EXAMPLE

On a polyethylene terephthalate support of 63 μm thickness is coated a dispersion, adjusted to a pH 11 with sodium hydroxide, with a wet coating thickness of 50 $g/m^2$ containing 8 $g/m^2$ of ethylene-acrylic acid with 20% acrylic acid, 2.4 $g/m^2$ of an anionic aliphatic polyester urethane with a viscosity of 500 mPa.s and 2.2 $g/m^2$ of an aliphatic polyether urethane with a viscosity of 350 mPa.s. After drying, the coated foil is personalized on the coated layer with a picture and personal data in mirror mode printed with a color laserprinter type Tektronix 740™. After the printing the personalized foil is placed into a passport booklet with the personalized side against the paper and laminated in said booklet with a laminator type Dorned LPB 150™. The sealing temperature in the layer is between 90 and 110° C. After testing, the foil sticks very well to the paper of the passport booklet and could not be removed without destroying the paper and the foil.

What is claimed is:

1. A laminating element comprising a transparent support coated with a thermally non-reversible layer comprising an ethylene-acrylic acid copolymer, a first polyurethane polymer, and a second polyurethane polymer, said layer having a pH of at least 10 and containing a metallic or an amphoteric cation.

2. A laminating element according to claim 1 wherein said copolymer comprises between 15 and 25% by weight acrylic acid.

3. A laminating element according to claim 1 wherein said copolymer is an ionomer.

4. A laminating element according to claim 1 wherein said first polyurethane is an anionic aliphatic polyester.

5. A laminating element according to claim 4 wherein said first polyurethane has a viscosity between 400 and 600 mPa.s.

6. A laminating element according to claim 1 wherein said second polyurethane is an aliphatic polyether.

7. A laminating element according to claim 6 wherein said second polyurethane has a viscosity between 250 and 450 mPa.s.

8. A laminating element according to claim 1 wherein said thermally non-reversible layer has a Tg below $-17°$ C.

9. A laminating element according to claim 8 wherein said thermally non-reversible layer has a Tg below $-19°$ C.

10. A laminating element according to claim 1 wherein said thermally non-reversible layer comprises between 4 and 12 $g/m^2$ of the copolymer ethylene-acrylic acid.

\* \* \* \* \*